(12) United States Patent
Bareggi

(10) Patent No.: US 6,405,598 B1
(45) Date of Patent: Jun. 18, 2002

(54) TIGHTENING TOOL AND MONITORING STATION WITH MUTUAL WIRELESS COMMUNICATION

(75) Inventor: Luigi Bareggi, Milan (IT)

(73) Assignee: BLM S.a.s. di L. Bareggi & C., Cusano Milan (IT)

( * ) Notice: Subject to any disclaimer, the term of this patent is extended or adjusted under 35 U.S.C. 154(b) by 0 days.

(21) Appl. No.: 09/589,575

(22) Filed: Jun. 7, 2000

(30) Foreign Application Priority Data

Jul. 12, 1999 (IT) .......................................... MI99A1523

(51) Int. Cl.[7] ................................................ F16B 31/02
(52) U.S. Cl. ...................................... 73/761; 73/862.23
(58) Field of Search .......................... 73/862.5, 862.333, 73/862.331, 862.23, 862.26, 761; 340/870.01

(56) References Cited

U.S. PATENT DOCUMENTS 6,167,788 B1 * 1/2001 Sconberger et al. .......... 81/467
6,181,257 B1 * 1/2001 Meek et al. ............ 340/870.01

* cited by examiner

Primary Examiner—Max Noori
Assistant Examiner—Andre Allen
(74) Attorney, Agent, or Firm—Martin Fleit; Paul D. Bianco

(57) ABSTRACT

A tightening tool that includes a microprocessor for management and measurement of tightening parameters and a transponder for communication with a monitoring station. The monitoring station is equipped with at least one decoder for communication with the transponder. The tool microprocessor unit receives control parameters from the station through the transponder and sends tool data to the station through the transponder.

11 Claims, 1 Drawing Sheet

TIGHTENING TOOL AND MONITORING STATION WITH MUTUAL WIRELESS COMMUNICATION

BACKGROUND OF THE INVENTION

The present invention relates to an innovative system comprising a tightening tool such as a microprocessor-controlled torque wrench and a tool-data processing terminal.

Torque wrenches or torque-controlled screwers are tools used in mass production and assembly lines to ensure that screws and nuts are tightened to the correct torque to achieve the desired preloading in the connection to ensure sufficient friction under the head to avoid screw loosening.

To be sure that a given screw has really been tightened, torque wrenches communicating completed tightening to an external monitoring system have been developed. Initially cable communication systems were proposed but the existence of a connecting cable limits the operator's freedom of movement and is often a source of failure. Therefore torque wrenches which communicate completed tightening by radio were developed.

Radio transmission is preferred by the operator but has as its main defect the poor reliability typical of radio transmissions. Indeed, all radio systems used in industry must work in a narrow frequency band, the number of available channels is limited and the possibility of interference is considerable. It is also extremely difficult to limit the radio range to the distance actually necessary e.g. one meter and no more and even a distant but strong signal can interfere with transmission. All this makes operating with a relatively high number of wrenches in a restricted area extremely complicated.

Because of the above mentioned limitations radio systems are employed in practice only for transmission of the wrench click when it occurs so as to count how many clicks have occurred.

In many cases today electronic torque wrenches with digital reading are used both for their high torque measurement accuracy and for their ability to memorize the values read to later transfer them to computer systems for data processing. This way it is possible to control the correctness of the tightening values a posteriori e.g. by connection with a cable via RS232 but it is not possible to be sure that a given tightening in a specific position was actually performed by the operator. To meet these requirements it is therefore necessary to connect the torque wrench to an external monitoring system which verifies correct operation performance in real time, memorizing the data related to the operation performed and previously programmed on the monitoring system. The monitoring system can then allow subsequent operations if the congruousness of the preceding operation is verified. Connection between the wrench and the monitoring system could benefit by radio transmission but the above mentioned shortcomings advise against such a solution.

Another complication is met with if two-way communication is necessary e.g. if tightening parameters change with the screw to be tightened and are known to the system but not to the wrench. On the one hand the system must communicate to the wrench the correct tightening parameters for a given screw and on the other hand the wrench must communicate not only that the tightening was performed correctly but the torque value achieved. In addition the data (torque) must be associated in real time with the position where the wrench is operating. It is clear that with such transmission complexity and with the necessity that the communication take place in real time and with no possibility of interference the radio system does not offer sufficient reliability assurance.

The general purpose of the present invention is to remedy the above mentioned shortcomings by making available a tightening tool and monitoring station which would communicate wirelessly with each other while avoiding interference and with the addition advantageously of identification and position information.

SUMMARY OF THE INVENTION

In view of this purpose it was sought to provide in accordance with the present invention a portable tightening tool and a monitoring and control station for this tool in which the tool comprises in combination a microprocessor unit for management and measurement of tool operation parameters and a transponder unit for communication with the monitoring station and equipped in turn with at least one decoder for communication with the transponder with the microprocessor unit receiving tightening parameters from the station through the transponder and sending to the station through the transponder measurements taken by the tool.

BRIEF DESCRIPTION OF THE DRAWING

To better clarify the purposes and characteristics of the device in accordance with the present invention a possible exemplifying embodiment thereof applying said principles is described below and illustrated in the only annexed diagrammatic drawing.

DETAILED DESCRIPTION OF THE INVENTION

Figure 1:
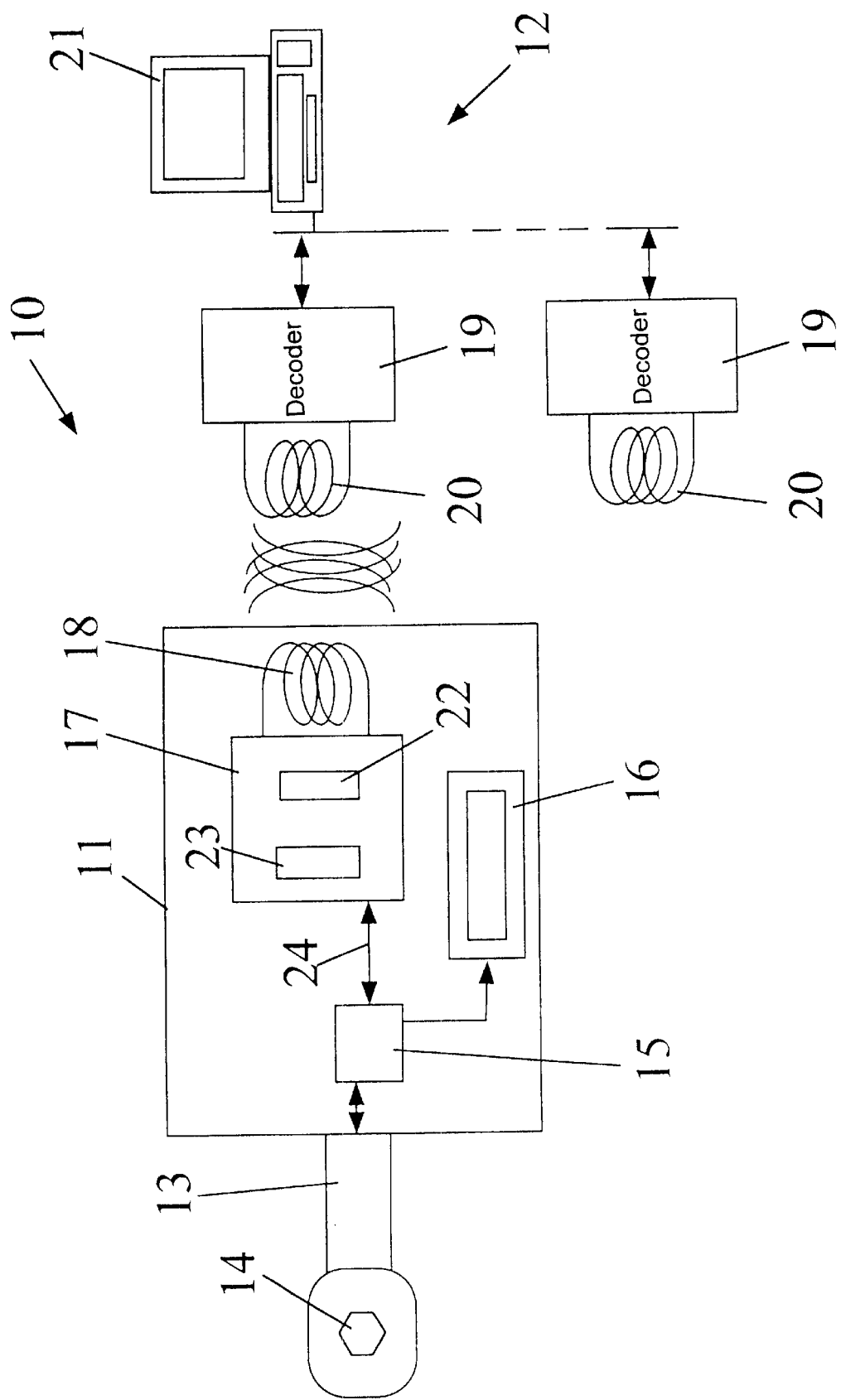

With reference to the FIGURE it shows diagrammatically a set 10 of a portable tightening tool 11 and a monitoring and control station 12 for said tool. The tool comprises an end unit 13 equipped with a part 14 for coupling with external members to be maneuvered with the tool. The tool is advantageously a torque wrench or a screwer and the part 14 can be a corresponding bush for coupling with nuts to be tightened.

The tool tightening parameters are controlled by a microprocessor unit 15. A display 16 can be used to supply visual information to the operator.

The part 13 comprises known torque measurers which will not be further described as they and the microprocessor tool torque measurement system are readily imaginable to one skilled in the art.

The tool also comprises a transponder unit 17 having an antenna 18 for communication with the monitoring station 21 which in turn has at least one decoder 19 with antenna 20 for communication with the transponder. The FIGURE shows two decoders 19 each with its own antenna for purposes explained below.

This way the tool microprocessor unit receives control parameters from the station through the transponder and sends the measured torque values to the station through the transponder. The microprocessor is connected to the transponder through a connection 24 to download in its memory 23 values to be sent and to take from a memory 23 the operating parameters received.

The transponder 17 also comprises an active or passive tag 22. As known, a passive tag is powered by using the RF ranges transmitted by the decoder antenna while an active tag uses a power supply of its own, in this case the tool's.

The decoder 19 and the antenna 20 generate a radio frequency (RF) range to activate the tag, transmit the data by modulating the RF, and receive the modulated RF from the tag, decoding the received data. The data sent by the tag are taken from the memory 23 and the data received from the tag are written in the memory 23. This way, since the memory is shared by the transponder and the microprocessor, the microprocessor can use the transponder to communicate with the fixed station 12.

The sharing, that is to say the connection 24, can be obtained in various ways, i.e. memory directly on the microprocessor CPU bus, by serial port, parallel port etc. It is now clear that the predetermined purposes have been achieved. The set proposed allows a 2-way connection between the tool electronics and the monitoring system. In addition each tag can be univocally identified and recognized by the control system during the data exchange. This system also allows exchange of data in the presence of other similar devices without the latter disturbing each other. The data written in the microprocessor tag memory are transferred to the control system only when it is enabled in the RF range generated by the decoder antenna. In addition if the tag is inactive because it is not in the RF range the data to be transmitted are held in memory until the next activation.

By using a fixed antenna 20 and a decoder 19 at each tool work point it is possible to program the tool locally for its position. The operator can thus carry out a plurality of sequential operations without having to worry about programming the tool before each operation.

During operation, the monitoring system sends information in one direction to the torque wrench and programs the operating parameters for a certain tightening by setting the wrench for performance of the operation. In the opposite direction, after performing the operation the wrench transmits the measured data to the control system which this way can be informed with certainty that the operation planned at that particular position was performed correctly.

With a tool in accordance with the present invention there is assurance and certainty of communication without the need of cumbersome physical connections between the tool and the control system, thus avoiding interference with data transmission even if several similar tools are operating nearby.

Naturally the above description of an embodiment applying the innovative principles of the present invention is given by way of non-limiting example of said principles within the scope of the exclusive right claimed here.

For example even though the description given of an embodiment of a torque wrench is preferred the present invention can be employed advantageously in other tightening tools such as e.g. battery-powered screwers equipped with an electronic system for measurement of the torque delivered. What is termed here 'the tool' need not be a unique whole. For example electronic torque wrenches can be imagined connected in turn by cable to signal amplifiers outside the wrench and in any case portable and in which the principles of the present invention are applied.

What is claimed is:

1. A system for monitoring a tool comprising:
a portable tightening tool locatable at a work point and including a microprocessor unit for management and measurement of tool operation parameters and a transponder unit; and
a monitoring and control station having at least one decoder for communication with the transponder unit of the tool, the decoder having an antenna that can generate a signal over a predetermined limited range in order to enable real time communication between the tool and the station,
wherein the antenna of the decoder is in juxtaposition to the work point so that the tool at the work point is within the predetermined generated signal range; and
wherein the microprocessor unit of the tool receives tightening parameters from the station through the transponder and the microprocessor unit of the tool sends to the station through the transponder measurement data taken by the tool when enabled within the predetermined signal range generated by the decoder antenna.

2. Set in accordance with claim 1 wherein the microprocessor unit is connected to the transponder to download in a memory therein measurement data to be sent to the station and to extract from a memory therein tightening parameters received from the station.

3. Set in accordance with claim 1 wherein the tool is a torque wrench.

4. Set in accordance with claim 1 wherein the transponder unit of the tool includes a tag for modulating a signal from the transponder to the antenna of the decoder.

5. Portable tightening tool comprising in combination a torque wrench, a microprocessor unit coupled to the torque wrench for management and measurement of tool operating parameters and a transponder unit electronically connected to the microprocessor for communication in real time with a monitoring station having a decoder located relative to the transponder for receiving signals therefrom and sending signals thereto, the transponder together with the microprocessor unit enabled for receiving tightening parameters from the station and for sending measurement data taken by the tool to the station, the transponder including a tag for modulating the communication with the monitoring station.

6. A method for controlling a portable tightening tool comprising in combination a microprocessor unit for management and measurement of tool operation parameters, and a transponder unit comprising the steps of:
a) locating the portable tool at a work point;
b) establishing a monitoring and control station for this tool equipped with at least one decoder having an antenna for communication with the transponder unit of the tool;
c) generating a signal via the antenna of the decoder over a predetermined limited range in order to enable real time communication between the tool and the station;
c) locating the antenna of the decoder in juxtaposition to the work point so that the tool at the work point is within the predetermined generated signal range;
d) enabling real time communication between the tool and the monitoring and control station when the tool is the predetermined range of the antenna;
e) sending tightening parameters from the station to the microprocessor unit of the tool while real time communication is enabled; and
f) sending measurement data taken by the tool while real time communication is enabled.

7. Method in accordance with claim 6 including the further step of storing measurement data in a memory in the tool.

8. Method in accordance with claim 6 including the further step of storing tightening parameters received from the station in a memory in the tool.

9. Method in accordance with claim 6 including the further step of modulating communication from the tool to the station.

10. Method of claim 6 including the further steps of establishing real time communication between the monitoring and control station and the plurality of tools, each located at a distinct work point, associating an antenna of the decoder in juxtaposition to each of the work points so that the tool at each work point is within the predetermined generated signal range of its associated antenna;

enabling real time communication between each tool and the monitoring and control station when said tool is within the predetermined range of its associated antenna;

sending tightening parameters from the station to the microprocessor unit of each tool while real time communication is enabled; and sending measurement data taken by each tool to the station while real time communication is enabled.

11. The method of claim 10 including the step of programming at least one tool for sequential operations at its respective work point.

* * * * *